(12) United States Patent
Jeong et al.

(10) Patent No.: US 10,163,246 B2
(45) Date of Patent: Dec. 25, 2018

(54) THREE-DIMENSIONAL IMAGE GENERATION APPARATUS AND METHOD USING REGION EXTENSION OF OBJECT IN DEPTH MAP

(75) Inventors: Young Ju Jeong, Seoul (KR); Yong Ju Jung, Metropolitan (KR); Du Sik Park, Suwon-si (KR); A Ron Baik, Yongin-si (KR); Ji Won Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1475 days.

(21) Appl. No.: 12/656,840

(22) Filed: Feb. 17, 2010

(65) Prior Publication Data

US 2010/0316284 A1    Dec. 16, 2010

(30) Foreign Application Priority Data

Jun. 10, 2009    (KR) .................. 10-2009-0051463

(51) Int. Cl.
| | |
|---|---|
| *G06K 9/00* | (2006.01) |
| *G06T 15/00* | (2011.01) |
| *G06T 5/00* | (2006.01) |
| *G06T 5/20* | (2006.01) |
| *H04N 13/261* | (2018.01) |

(52) U.S. Cl.
CPC .............. *G06T 15/00* (2013.01); *G06T 5/002* (2013.01); *G06T 5/20* (2013.01); *H04N 13/261* (2018.05); *G06T 2207/10028* (2013.01); *G06T 2207/20192* (2013.01)

(58) Field of Classification Search
None
See application file for complete search history.

(56) References Cited

U.S. PATENT DOCUMENTS

| | | | | |
|---|---|---|---|---|
| 8,213,711 | B2* | 7/2012 | Tam ......................... | G06T 7/50 |
| | | | | 382/162 |
| 2007/0024614 | A1* | 2/2007 | Tam ..................... | H04N 13/026 |
| | | | | 345/419 |
| 2010/0026712 | A1* | 2/2010 | Aliprandi ........... | H04N 13/0011 |
| | | | | 345/629 |
| 2011/0115886 | A1* | 5/2011 | Nguyen ............... | H04N 13/025 |
| | | | | 348/47 |
| 2011/0261050 | A1* | 10/2011 | Smolic .................... | G06T 15/20 |
| | | | | 345/419 |

OTHER PUBLICATIONS

Tam, Wa James, et al. "Depth image based rendering for multiview stereoscopic displays: Role of information at object boundaries." Optics East 2005. International Society for Optics and Photonics, 2005.*
Korean Office Action dated May 27, 2015 in counterpart Korean Application No. 10-2009-0051463 (7 pages with English translation).

\* cited by examiner

*Primary Examiner* — Fred Hu
(74) *Attorney, Agent, or Firm* — NSIP Law

(57) ABSTRACT

A three-dimensional (3D) image generation apparatus and method using a region extension of an object in a depth map is provided. The 3D image generation apparatus may include a discontinuity preservation smoothing filtering unit to apply a discontinuity preservation smoothing filter preserving discontinuity of a boundary or a shape of a depth image, a boundary preservation filtering unit to apply a max filter to a depth image for increasing a depth value of an object, and a rendering unit to render a two-dimensional (2D) color image and the filtered depth image and to generate a 3D image.

7 Claims, 8 Drawing Sheets

THREE-DIMENSIONAL IMAGE GENERATION APPARATUS AND METHOD USING REGION EXTENSION OF OBJECT IN DEPTH MAP

CROSS-REFERENCE TO RELATED APPLICATIONS

This application claims the benefit of Korean Patent Application No. 10-2009-0051463, filed on Jun. 10, 2009, in the Korean Intellectual Property Office, the disclosure of which is incorporated herein by reference.

BACKGROUND

1. Field

One or more embodiments of the present disclosure relate to a three-dimensional (3D) image generation apparatus and method that may generate a 3D image from a two-dimensional (2D) image and a depth image, and more particularly, to a 3D image generation apparatus and method using a region extension of an object in a depth map.

2. Description of the Related Art

When a three-dimensional (3D) virtual image is generated from a two-dimensional (2D) color image and a depth image, the depth image may be inaccurate when noisy or when the depth image is automatically restored using computer graphics technology. When a 3D virtual image is generated based on the depth image, objects included in an original image may not preserve a boundary or a shape of each of the objects in the 3D virtual image.

When viewing a 3D virtual image generated as described above, a stereoscopic effect may be reduced or a user may feel more fatigued, since a boundary of an object may not be maintained or a shape of the object may be changed.

Accordingly, a technology that can preserve a shape of an object included in an original image and generate a high-quality 3D virtual image when a 3D virtual image is generated from a color image and a depth image is required.

SUMMARY

Additional aspects of the example embodiments will be set forth in part in the description which follows and, in part, will be apparent from the description, or may be learned by practice of the embodiments.

According to example embodiments, there may be provided a three-dimensional (3D) image generation apparatus, including: a boundary preservation filtering unit to apply a max filter to a depth image, the max filter increasing a depth value of an object; and a rendering unit to render a two-dimensional (2D) color image and the filtered depth image and to generate a 3D image.

According to other example embodiments, the 3D image generation apparatus may further include a discontinuity preservation smoothing filtering unit to apply a discontinuity preservation smoothing filter, preserving discontinuity of a boundary or a shape of the object, to the depth image.

According to example embodiments, there may be provided a 3D image generation method, including: applying a max filter to a depth image, the max filter increasing a depth value of an object; and rendering a 2D color image and the filtered depth image and generating a 3D image.

According to other example embodiments, the 3D image generation method may further include: applying a discontinuity preservation smoothing filter, preserving discontinuity of a boundary or a shape of the object, to the depth image.

BRIEF DESCRIPTION OF THE DRAWINGS

These and/or other aspects will become apparent and more readily appreciated from the following description of the example embodiments, taken in conjunction with the accompanying drawings of which.

DETAILED DESCRIPTION

Figure 1:
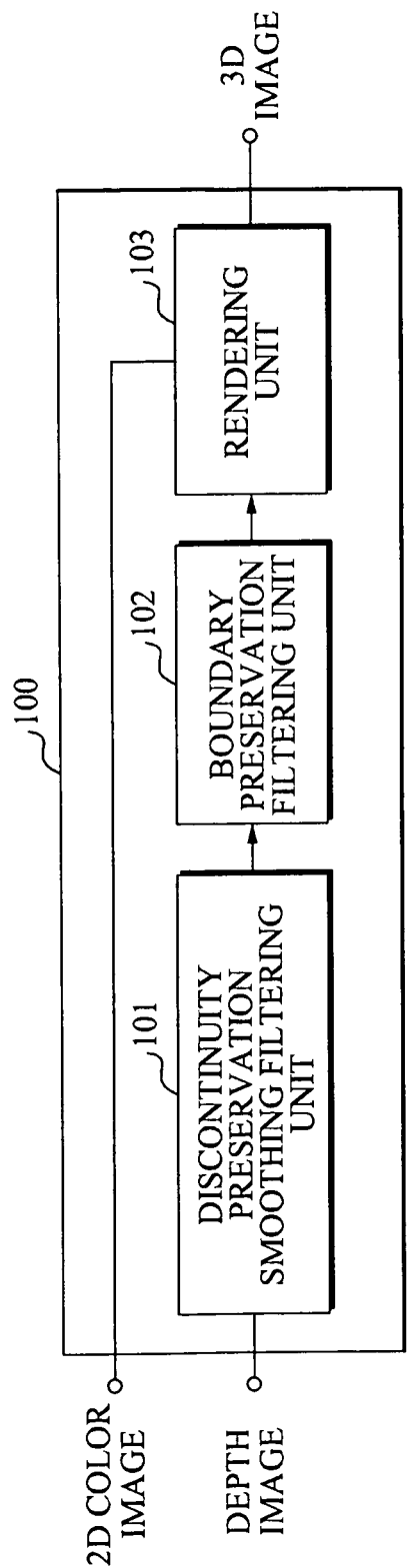
FIG. 1 illustrates a block diagram of a three-dimensional (3D) image generation apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a block diagram of a three-dimensional (3D) image generation apparatus 100 according to example embodiments.

The 3D image generation apparatus 100 may include, for example, a boundary preservation filtering unit 102 and a rendering unit 103. The 3D image generation apparatus 100 may further include, for example, a discontinuity preservation smoothing filtering unit 101. Referring to FIG. 1, a two-dimensional (2D) color image and a depth image may each be input to the 3D image generation apparatus 100.

The discontinuity preservation smoothing filtering unit 101 may apply a smoothing filter that may preserve discontinuity of a boundary or a shape of an object in a depth image. For example, the discontinuity preservation smoothing filtering unit 101 may apply a discontinuity preservation smoothing filter to remove an uneven surface due to an irregular depth value in the object. In this instance, the discontinuity preservation smoothing filtering unit 101 may apply the discontinuity preservation smoothing filter to a region within the boundary of the object. Accordingly, the discontinuity preservation smoothing filtering unit 101 may maintain a depth value of a same object by applying the discontinuity preservation smoothing filter.

The boundary preservation filtering unit 102 may apply a max filter that may increase a depth value of the object in the depth image. For example, the boundary preservation filtering unit 102 may extend the boundary of the object in the depth image through the max filter to increase the depth value of the object. In this instance, the boundary preservation filtering unit 102 may substitute a depth value of a background region for the depth value of the object to increase the depth value of the object. Here, the background region may correspond to surroundings of the object. For example, the depth value may be based on a pixel unit of the object in a foreground area of the depth image.

Accordingly, artifacts, caused by noise included in the depth image, and the pixel-based depth value may be reduced. Also, a shape of an object in an original image may be preserved in a virtual left image and virtual right image used to generate a 3D image.

The 3D image generation apparatus 100 may generate the 3D image by applying both the max filter and the discontinuity preservation smoothing filter or by applying the max filter without applying the discontinuity preservation smoothing filter.

The rendering unit 103 may render a 2D color image and the filtered depth image and generate the 3D image. For example, the rendering unit 103 may perform a parallax shift with respect to the object in the depth image and a background region of the object by a disparity, and generate a virtual left image and a virtual right image of the parallax-shifted depth image.

Figure 2:
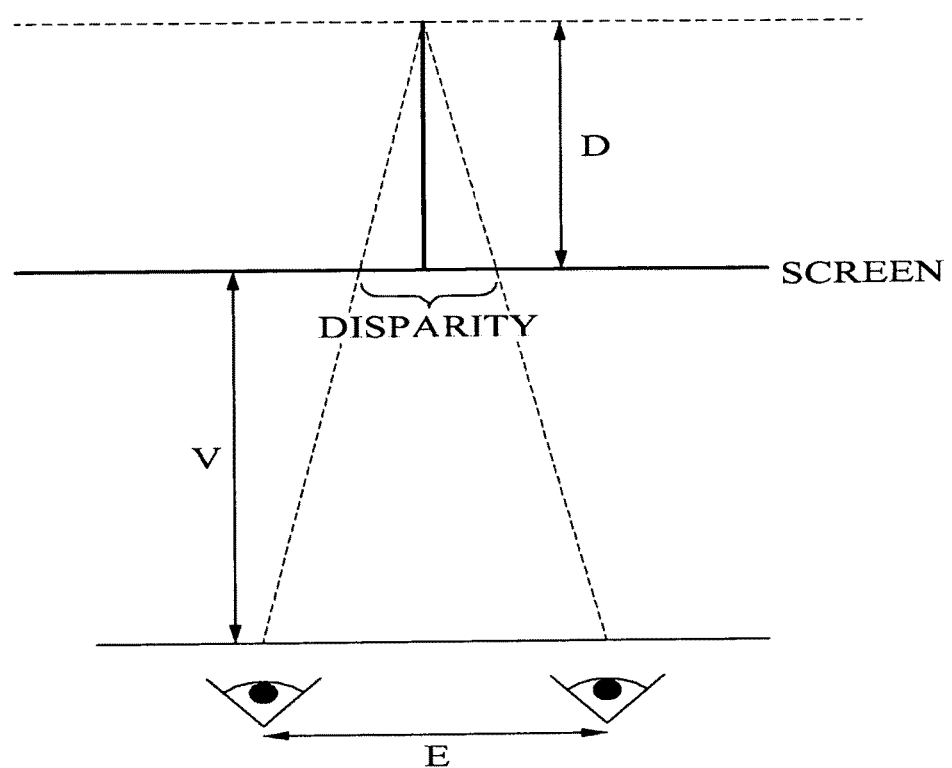
FIG. 2 illustrates an example of a disparity with respect to an object viewed by both eyes.

FIG. 2 illustrates an example of a disparity with respect to an object viewed with both eyes.

In FIG. 2, V may denote a distance between a 3D display and an observer, D may denote a virtual distance between an object and a screen, and E may denote a distance between each of the eyes of the observer.

In this instance, the disparity with respect to the object viewed with both eyes may be represented as $$\text{Disparity} = \frac{D \cdot E}{D + V}$$

According to the equation, a shift equal to the disparity may be used so that an object in a virtual 3D image is shown to be beyond the screen by the virtual distance D. Here, the shift may be a shift of a viewpoint viewed by both eyes. Accordingly, the 3D display may generate a virtual left image and a virtual right image, which are spaced apart from each other by the disparity, and thereby may enable the observer to recognize the 3D image.

When the virtual left image and the virtual right image, which are spaced apart from each other by the disparity, are generated from an original image, an artifact may be generated. The artifact may be caused by a depth image quantized based on a pixel unit or by noise included in the depth image or both. Accordingly, a 3D image generation apparatus according to example embodiments may apply a max filter to generate a virtual left image and virtual right image with fewer artifacts, and apply a discontinuity preservation smoothing filter to preserve a shape of the object.

Figure 3:
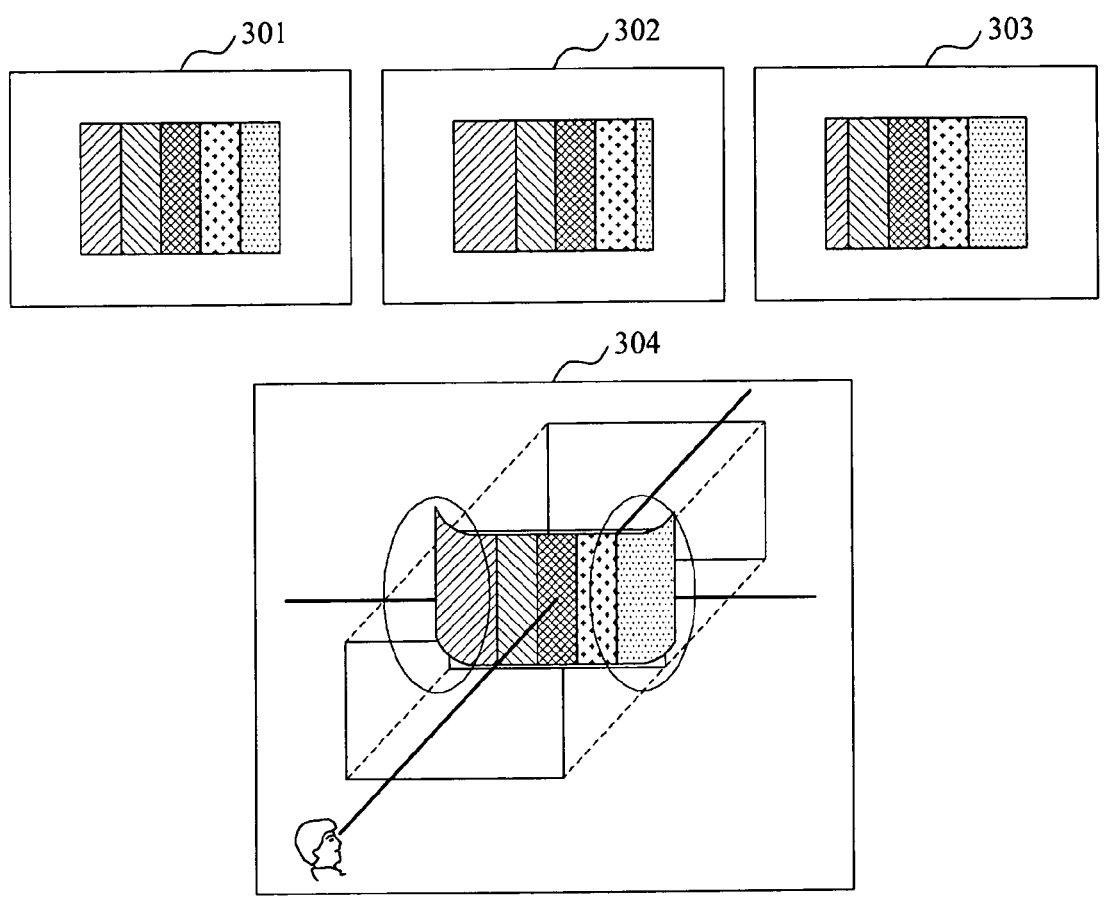
FIG. 3 illustrates an example of a distorted 3D image.

FIG. 3 illustrates an example of a distorted 3D image.

In the example of FIG. 3, an image 301 is an original image, an image 302 is a virtual left image, and an image 303 is a virtual right image. In the image 302, a right side of an object is expanded and a left side of the object is reduced. Also, in the image 303, a right side of the object is reduced and a left side of the object is expanded. When an observer views the distorted virtual left image 302 and the distorted virtual right image 303 through a 3D display, the observer may recognize a distorted 3D object where both sides are bent as illustrated in an image 304. Accordingly, a stereoscopic effect may be reduced, and the observer may become visually fatigued due to the discrepancy between an actual object shape and an object shape displayed by the 3D display.

Figure 4:
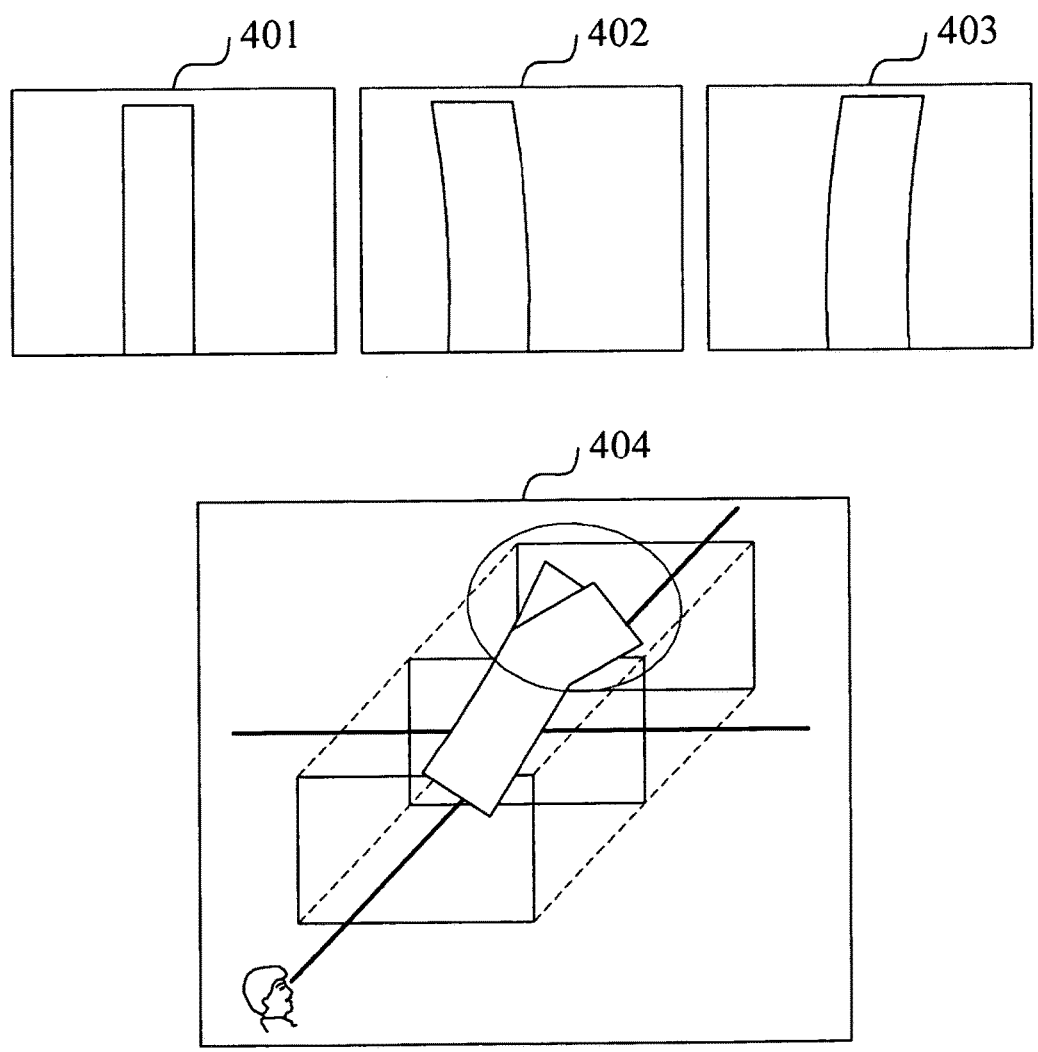
FIG. 4 illustrates another example of a distorted 3D image.

FIG. 4 illustrates another example of a distorted 3D image.

In the example of FIG. 3, an image 401 is an original image, an image 402 is a virtual left image, and an image 403 is a virtual right image. As illustrated in FIG. 4, when an observer views a distorted virtual left image 402 and virtual right image 403 through a 3D display, a shape of an object may be distorted. Also, an image viewed in a left eye and an image viewed in a right eye may not be appropriately recognized by the brain of the observer. Accordingly, the observer may not recognize the object as a single 3D shape as illustrated in image 404. Also, the observer may perceive the 3D shape as distorted, and thereby may become visually fatigued.

Figure 5:
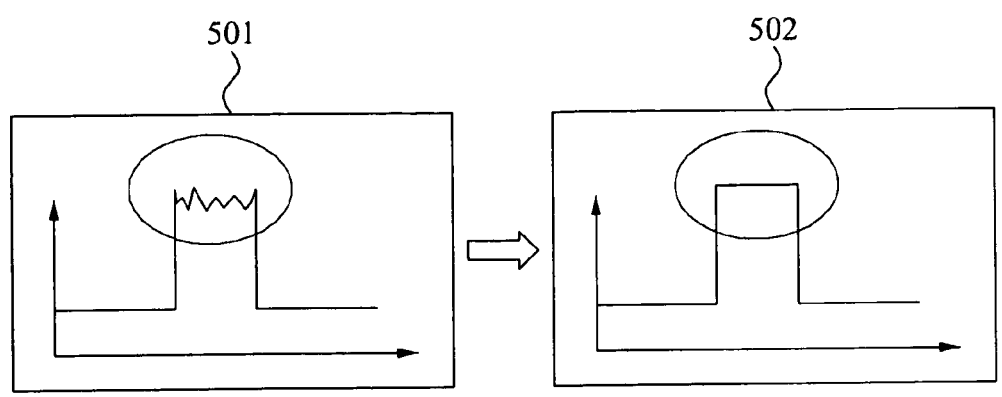
FIG. 5 illustrates an example of applying a discontinuity preservation smoothing filter to a depth image according to example embodiments.

FIG. 5 illustrates an example of applying a discontinuity preservation smoothing filter to a depth image according to example embodiments.

Referring to FIG. 5, two-dimensional graph 501 indicates a distribution of depth values of the depth image before the discontinuity preservation smoothing filter is applied, and two-dimensional graph 502 indicates a distribution of depth values of the depth image after the discontinuity preservation smoothing filter is applied. A horizontal axis of the graph 501 and the graph 502 indicates row data of the depth image, and a vertical axis indicates a row of the depth image. Also, a height may be used in a three-dimensional display to indicate the depth value.

It may be ascertained that the depth values are not uniform in the graph 501. In this instance, when the discontinuity preservation smoothing filter is applied, the depth values may be maintained in a same object as illustrated in the graph 502.

Figure 6:
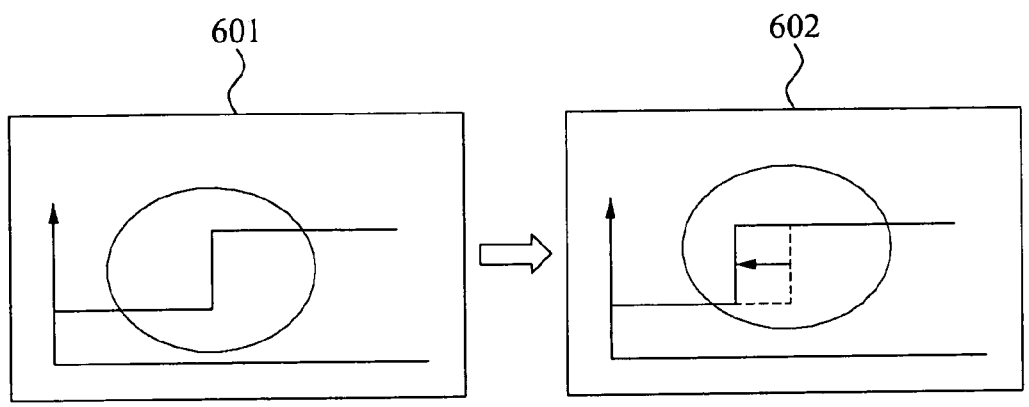
FIG. 6 illustrates an example of applying a max filter to a depth image according to example embodiments.

FIG. 6 illustrates an example of applying a max filter to a depth image according to example embodiments.

Referring to FIG. 6, graph 601 indicates a distribution of depth values of the depth image before the max filter is applied, and graph 602 indicates a distribution of depth values of the depth image after the max filter is applied. A horizontal axis of the graph 601 and the graph 602 indicates row data of the depth image, and a vertical axis may indicate a depth value of a corresponding row.

A 3D image generation apparatus may apply the max filter, increasing a depth value of an object, to the depth image. For example, the 3D image generation apparatus may substitute a depth value of a background region for the depth value of the object to increase the depth value of the object. Here, the background region may correspond to surroundings of the object. Accordingly, a boundary of the object may be extended when the max filter is applied, as illustrated in the graph 602.

Figure 7:
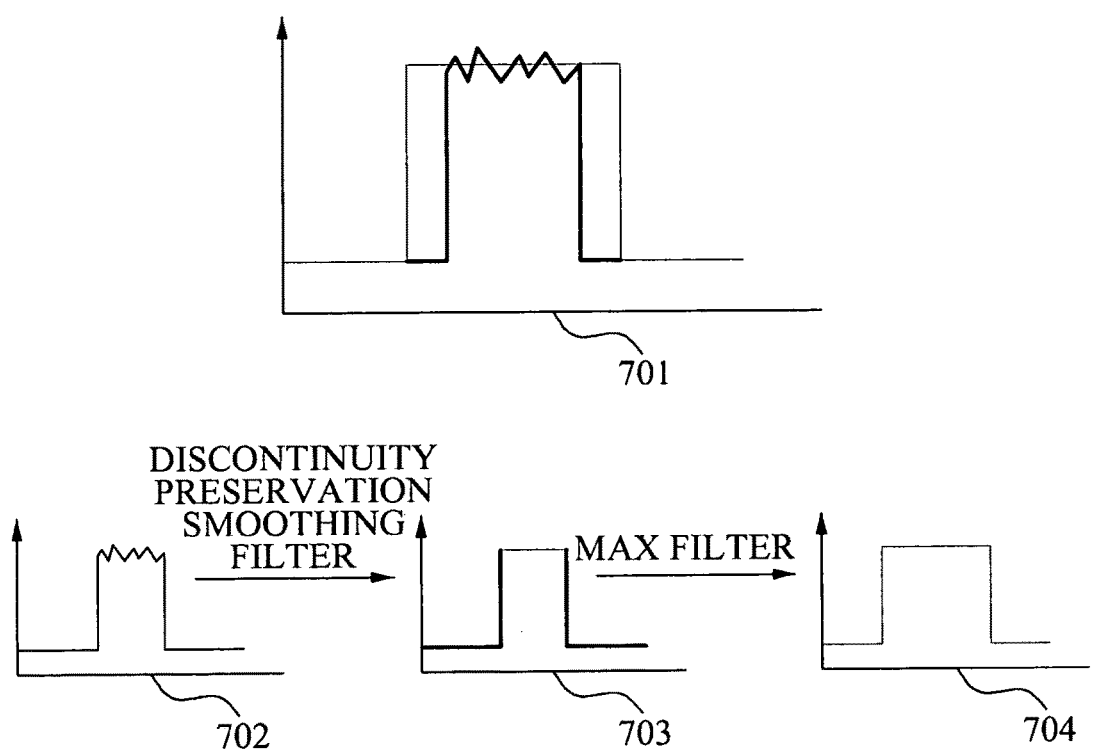
FIG. 7 illustrates an example of applying a discontinuity preservation smoothing filter and a max filter to a depth image according to example embodiments.

FIG. 7 illustrates an example of applying a discontinuity preservation smoothing filter and a max filter to a depth image according to example embodiments.

Referring to FIG. 6, graph 701 indicates a result of comparing an original depth image and a depth image where a discontinuity preservation smoothing filter and a max filter are applied. Graph 702 indicates the original depth image, graph 703 indicates an image where the discontinuity preservation smoothing filter is applied, and graph 704 indicates an image where the max filter is applied. As described above, a 3D image generation apparatus according to example embodiments may apply the discontinuity preservation smoothing filter and the max filter to the original depth image, or may apply the max filter without applying the discontinuity preservation smoothing filter. In an embodiment, the 3D image generation apparatus may first apply the discontinuity preservation smoothing filter and then apply the max filter.

As illustrated in graph 702 and graph 703, when the discontinuity preservation smoothing filter is applied, a depth value of an object in the depth image may be similarly maintained. That is, the 3D image generation apparatus may preserve discontinuity of a boundary or a shape of the object by applying the discontinuity preservation smoothing filter.

Also, as illustrated in graph 703 and graph 704, the boundary of the object in the depth image may be extended by applying the max filter. Specifically, when the max filter is applied, a background region of the object may be substituted for a depth value of the object, and thus the boundary of the object may be extended.

Figure 8:
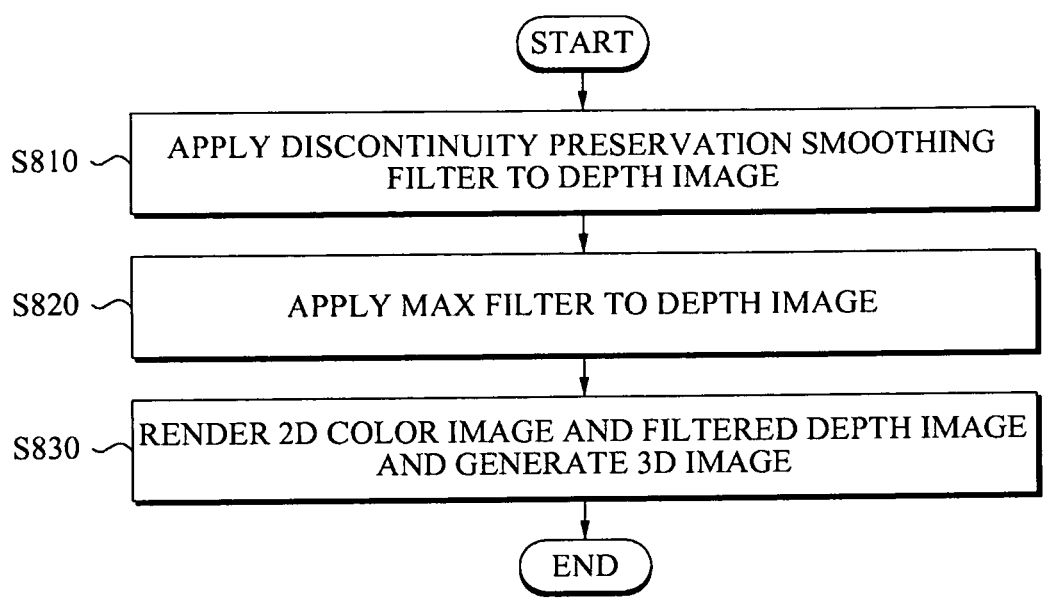
FIG. 8 illustrates a flowchart of a 3D image generation method according to example embodiments.

FIG. 8 illustrates a flowchart of a 3D image generation method according to example embodiments.

In operation S810, the 3D image generation apparatus may apply a discontinuity preservation smoothing filter to a depth image. The discontinuity preservation smoothing filter may preserve discontinuity of a boundary or a shape of an object. For example, the discontinuity preservation smoothing filter may be applied to a region within the boundary of the object.

In operation S820, the 3D image generation apparatus may apply a max filter to a depth image. The max filter may increase a depth value of the object. For example, the 3D image generation apparatus may apply the max filter to the depth image where the discontinuity preservation smoothing filter is applied.

In an embodiment, the 3D image generation apparatus may extend a boundary of the object in the depth image through the max filter to increase the depth value of the object. Specifically, the 3D image generation apparatus may substitute a depth value of a background region for the depth value of the object to increase the depth value of the object. Here, the background region may correspond to surroundings of the object.

In operation S830, the 3D image generation apparatus may render a 2D color image and the filtered depth image and generate a 3D image. For example, the 3D image generation apparatus may render the depth image where the discontinuity preservation smoothing filter and the max filter are applied, and generate the 3D image.

Specifically, the 3D image generation apparatus may perform a parallax shift with respect to the object in the depth image and a background region of the object by a disparity, and generate a virtual left image and a virtual right image of the parallax-shifted depth image.

Further detailed descriptions will be omitted herein, since the 3D image generation method may correspond to descriptions described above with reference to FIG. 1 through FIG. 7.

According to example embodiments, a max filter extending a boundary of an object may be applied to a depth image, and thus a shape of the object of an original image may be preserved, and a stereoscopic effect may increase.

Also, according to example embodiments, a discontinuity preservation smoothing filter preserving discontinuity of a boundary or a shape of an object may be applied to a depth image, and a depth value of the object may be maintained.

The 3D image generation method according to the above-described example embodiments may be recorded in computer-readable media including program instructions to implement various operations embodied by a computer or processor. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer or processor using an interpreter.

The described hardware devices may also be configured to act as one or more software modules in order to perform the operations of the above-described example embodiments, or vice versa. The methods described here may be executed on a general purpose computer or processor or may be executed on a particular machine such as the three-dimensional (3D) image generation apparatus described herein.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. A three-dimensional (3D) image generation apparatus, comprising:
   a processor comprising:
   a filtering unit to filter a depth image using a first filter and a second filter; and
   a rendering unit to render a two-dimensional (2D) color image and the filtered depth image and to generate a 3D image using a processor,
   wherein the filtering unit smoothes, by using the first filter, a depth value of an object of the depth image, and substitutes, by using the second filter, the smoothed depth value for a depth value of a peripheral region of the object of the depth image to extend an outermost boundary of the object, wherein the peripheral region corresponds to surroundings of the object, and
   wherein a depth value of each pixel in the peripheral region is equal to the smoothed depth value.

2. The 3D image generation apparatus of claim 1, wherein the first filter is applied to a region within the boundary of the object.

3. The 3D image generation apparatus of claim 1, wherein the rendering unit performs a parallax shift with respect to the object in the depth image and a background region of the object by a disparity, and generates a virtual left image and a virtual right image of the depth image.

4. A processor-implemented 3D image generation method, comprising:
   filtering, by using a first filter and a second filter, a depth image; and
   rendering a 2D color image and the filtered depth image and generating a 3D image using a processor,
   wherein the filtering comprises smoothing, by using the first filter, a depth value of an object of the depth image, and substituting, by the second filter, the smoothed depth value for a depth value of a peripheral region of the object of the depth image to extend an outermost boundary of the object, wherein the peripheral region corresponds to surroundings of the object, and wherein a depth value of each pixel in the peripheral region is equal to the smoothed depth value.

5. The 3D image generation method of claim 4, wherein the first filter is applied to a region within the boundary of the object.

6. The 3D image generation method of claim 4, wherein the generating of the 3D image comprises: performing a parallax shift with respect to the object in the depth image and a background region of the object by a disparity; and generating a virtual left image and a virtual right image of the parallax-shifted depth image.

7. A non-transitory computer-readable recording medium storing a program for implementing a 3D image generation method, comprising:

filtering, by using a first filter and a second filter, a depth image; and rendering a 2D color image and the filtered depth image and generating a 3D image using a processor;

wherein the filtering comprises smoothing, by using the first filter, a depth value of an object of the depth image, and substituting, by using the second filter, the smoothed depth value of the object for a depth value of a peripheral region of the object of the depth image to extend an outermost boundary of the object, wherein the peripheral region corresponds to surroundings of the object, and wherein a depth value of each pixel in the peripheral region is equal to the smoothed depth value.

* * * * *